United States Patent
Kai et al.

(10) Patent No.: US 12,013,084 B2
(45) Date of Patent: Jun. 18, 2024

(54) HIGH-PRESSURE TANK UNIT

(71) Applicant: TOYOTA JIDOSHA KABUSHIKI KAISHA, Toyota (JP)

(72) Inventors: Yuki Kai, Nagoya (JP); Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 17/811,705

(22) Filed: Jul. 11, 2022

(65) Prior Publication Data
US 2023/0017919 A1  Jan. 19, 2023

(30) Foreign Application Priority Data
Jul. 13, 2021 (JP) .................................. 2021-115947

(51) Int. Cl.
*F17C 1/06* (2006.01)
*F17C 1/16* (2006.01)

(52) U.S. Cl.
CPC .................. *F17C 1/06* (2013.01); *F17C 1/16* (2013.01); *F17C 2201/0109* (2013.01); *F17C 2201/0138* (2013.01); *F17C 2203/0604* (2013.01); *F17C 2205/0305* (2013.01); *F17C 2223/0123* (2013.01)

(58) Field of Classification Search
CPC ............... F17C 1/16; F17C 2201/0109; F17C 2201/0138; F17C 2203/0604; F17C 2205/0305

USPC ......................................................... 220/582
See application file for complete search history.

(56) References Cited

U.S. PATENT DOCUMENTS

| | | | | |
|---|---|---|---|---|
| 2007/0111579 A1* | 5/2007 | Ishimaru | .................. | F17C 1/16 439/312 |
| 2010/0258573 A1* | 10/2010 | Weber | ....................... | F17C 1/06 220/586 |
| 2019/0152312 A1* | 5/2019 | Park | ................. | B60K 15/03006 |
| 2021/0123565 A1* | 4/2021 | Kerforn | .................... | F17C 1/00 |

FOREIGN PATENT DOCUMENTS

JP  2020112189 A  7/2020

* cited by examiner

Primary Examiner — John K Fristoe, Jr.
Assistant Examiner — Laura E. Parker
(74) Attorney, Agent, or Firm — Dickinson Wright, PLLC

(57) ABSTRACT

A high-pressure tank unit capable of securing the sealing property of a sealing member in the neck of the high-pressure tank. The tank unit includes a high-pressure tank and a connecting member connected to the high-pressure tank. The connecting member has an annular sealing member disposed between a liner and an insert portion and adapted to seal a housing space. The high-pressure tank has a tubular body disposed between the liner and reinforcing layer in a position facing the sealing member so as to surround the outer peripheral surface of the liner, the tubular body adapted to restrict radial deformation of the inner peripheral surface of the neck. The longitudinal modulus of the material along the circumferential direction of the tubular body is higher than each of the longitudinal moduli of the materials along the circumferential direction of the liner and reinforcing layer.

3 Claims, 6 Drawing Sheets

HIGH-PRESSURE TANK UNIT

CROSS REFERENCE TO RELATED APPLICATIONS

The present application claims priority from Japanese patent application JP 2021-115947 filed on Jul. 13, 2021, the entire content of which is hereby incorporated by reference into this application.

BACKGROUND

Technical Field

The present disclosure relates to a high-pressure tank unit including a high-pressure tank and a connecting, member connected to the high-pressure tank.

Background Art

Natural gas or fuel cell vehicles, for example, use a high-pressure tank for storing a fuel gas. A high-pressure tank of this type includes a liner for housing a fluid as a high-pressure gas and a reinforcing layer formed of a fiber-reinforced resin that covers the outer peripheral surface of the liner.

The high-pressure tank includes a body portion in which a housing space for housing a high-pressure gas is formed and a neck formed continuously with an end of the body portion. The neck has an opening in, communication with the housing space of the body portion, and a connecting member such as a manifold or a bracket is connected to the opening. The connecting member includes an insert portion to be inserted into the neck through the opening of the high-pressure tank along the inner peripheral surface of the liner, and an annular sealing member provided between the liner and the insert portion, the annular sealing member adapted to seal the housing space.

SUMMARY

However, as disclosed in JP 2020-112189 A, when the housing space of the high-pressure tank is filled with a high-pressure fluid and the body portion tends to radially expand due to the internal pressure with the fluid, the neck also tends to radially expand. Thus, the contact pressure of the sealing member provided in the insert portion against the liner of the neck is reduced, which could deteriorate the sealing property of the neck of the high-pressure tank.

The present disclosure has been made in view of the foregoing and provides a high-pressure tank unit capable of securing the sealing property of the sealing member in the neck of the high-pressure tank.

In view of the foregoing, a high-pressure tank unit that the present disclosure provides is a tank unit including: a high-pressure tank having a liner in which a housing space for housing a fluid is formed, with an opening formed on at least one end side thereof, a reinforcing layer formed of a fiber-reinforced resin, the reinforcing layer covering an outer peripheral surface of the liner, a body portion having the housing space, and a neck in which the opening is formed, the neck continuous with at least one end of the body portion; and a connecting member having an insert portion to be inserted into the neck through the opening along an inner peripheral surface of the liner, the connecting member connected to the high-pressure tank so as to cover the opening, in which the connecting member has an annular sealing member disposed between the liner and the insert portion, the annular sealing member adapted to seal the housing space, the high-pressure tank has a tubular body disposed between the liner and the reinforcing layer, in at least a position facing the sealing member, so as to surround the outer peripheral surface of the liner, the tubular body adapted to restrict radially expanding deformation of an inner peripheral surface of the neck, and a longitudinal modulus of a material along a circumferential direction of the tubular body is higher than a longitudinal modulus of a material along a circumferential direction of the liner and is higher than a longitudinal modulus of a material along a circumferential direction of the reinforcing layer.

According to the present disclosure, the insert portion of the connecting member is inserted into the neck of the high-pressure tank through the opening and the annular sealing member is brought into contact with the liner of the neck, so that the housing space is sealed. Herein, when the housing space of the high-pressure tank is filled with a high-pressure fluid, the neck as well as the body portion tends to radially expand due to the internal pressure with the fluid. However, in the present disclosure, the tubular body is disposed between the liner and the reinforcing layer, in a position facing the sealing member so as to surround the outer peripheral surface of the liner, and restricts radially expanding deformation of the inner peripheral surface of the neck. That is, according to the present disclosure, the specific configuration for restricting such deformation is that the longitudinal modulus of the material along the circumferential direction of the tubular body is higher than the longitudinal modulus of the material along the circumferential direction of the liner and is higher than the longitudinal modulus of the material along the circumferential direction of the reinforcing layer. Thus, the tubular body can suppress the radial expansion of the liner caused by the hoop stress due to the high-pressure fluid, as compared to a case without a tubular body. As a result, the sealing property of the sealing member in the neck of the high-pressure tank can be secured.

In another aspect, a portion of the tubular body that includes an end of the tubular body on a side of the body portion becomes thinner toward the end of the tubular body on the side of the body portion. According to this aspect, since the portion of the tubular body that includes the end on the side of the body portion becomes thinner toward the end on the side of the body portion, the end on the side of the body portion is likely to deform. Thus, when the housing space of the high-pressure tank is filled with a high-pressure fluid, the end of the tubular body follows the deformation of the liner in such a manner as radially expanding, so that the stress exerted on a portion of the liner contacting the end can be reduced.

In further another aspect, at least the end on the side of the body portion of the opposite ends of the tubular body is covered with a cushioning material that is softer than the material of the tubular body. According to this aspect, when the housing space of the high-pressure tank is filled with a high-pressure fluid, the liner contacts the end of the tubular body, not directly but via the cushioning material and the cushioning material follows the deformation of the liner, so that the stress exerted on the liner can be reduced.

In yet another aspect, a facing surface of the tubular body that faces the outer peripheral surface of the liner and that is on the side of the body portion expands in a radial direction of the tubular body in such a manner as leaving the outer peripheral surface of the liner.

According to this aspect, since the facing surface of the tubular body that is on the side of the body portion expands in the radial direction of the tubular body in such a manner as leaving the outer peripheral surface of the liner, contact of the liner with an inner edge of the tubular body can be avoided, so that damage to the liner can be avoided.

According to the present disclosure, the sealing property of the sealing member in the neck of the high-pressure tank can be secured.

DETAILED DESCRIPTION

Figure 1:
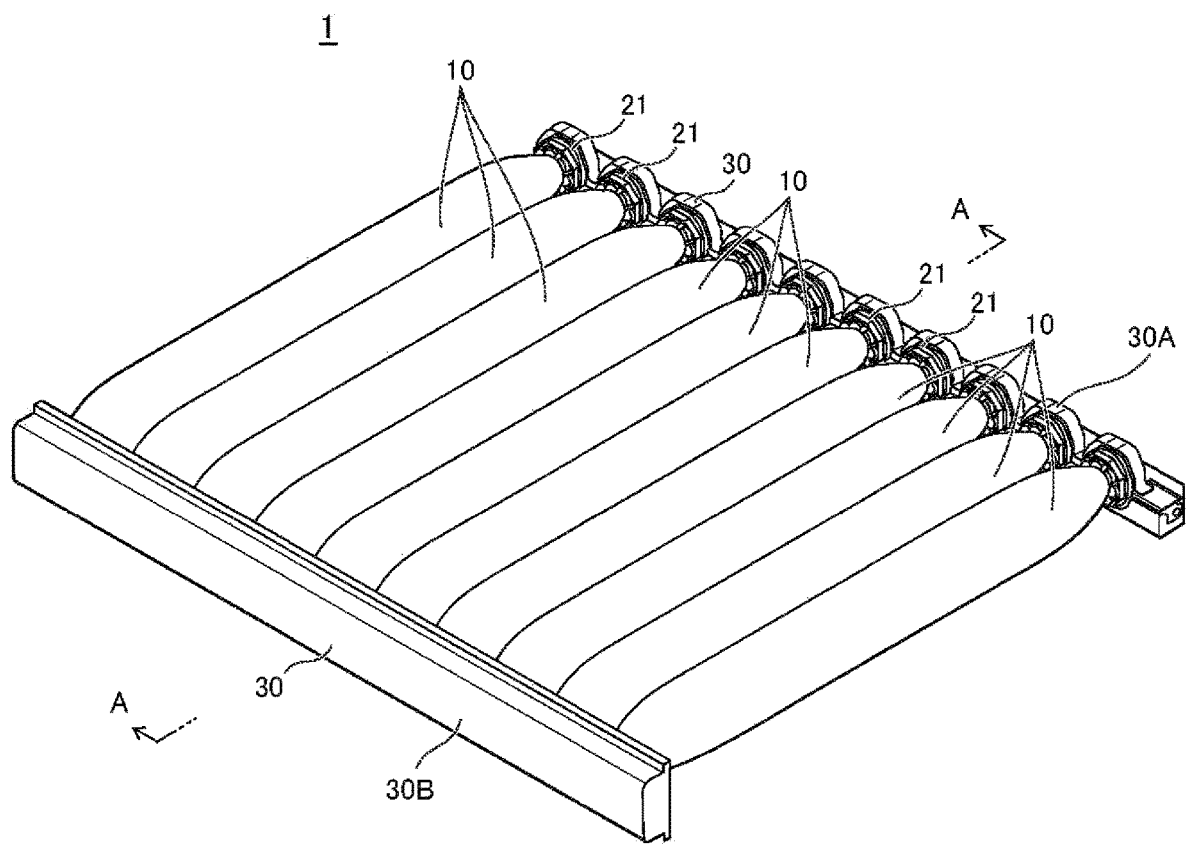
FIG. 1 is a perspective view showing the structure of a tank unit according to a first embodiment of the present disclosure.
Figure 2:
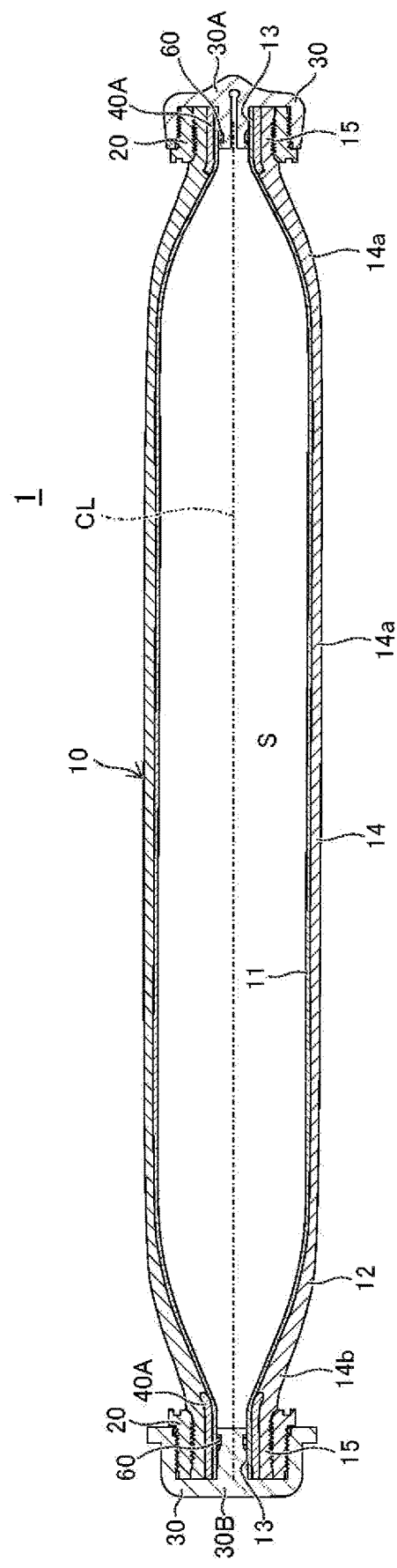
FIG. 2 is a cross-sectional view of the tank unit of FIG. 1 taken along line A-A.

An embodiment of a tank unit 1 according to the present disclosure will be described below with reference to FIG. 1 to FIG. 5. As shown in FIG. 1, the tank unit 1 according to the present embodiment includes a high-pressure tank 10 and a pair of connecting members 30, 30 connected to the opposite ends of the high-pressure tank 10.

The high-pressure tank 10 is a tank to be mounted on a fuel cell vehicle and filled with a high-pressure hydrogen gas. The gas available for filling the high-pressure tank 10 is not limited to a high-pressure hydrogen gas, but compressed gases such as CNG (compressed natural gas), various types of liquefied gases, such as LNG (liquefied natural gas) and LPG (liquefied petroleum gas), and any other gases (fluids) may be used for filling, and a fluid such as a liquid may be used for filling temporarily for a pressure test.

The high-pressure tank 10 includes a liner 11 having openings 13 formed at its opposite ends in which a housing space S for housing a hydrogen gas is formed, and a reinforcing layer 12 layered on the liner 11 so as to cover an outer peripheral surface 11a of the liner 11. The liner 11 is formed of a material having a gas barrier property and the reinforcing layer 12 is formed of a fiber-reinforced resin.

The high-pressure tank 10 includes a body portion 14 having the aforementioned housing space S, and a pair of necks 15, 15, each neck 15 having the opening 13 and being continuous with each of the ends of the body portion 14. In the present embodiment, the necks 15, 15 are formed on the opposite sides of the high-pressure tank 10, but the high-pressure tank 10 may be in a bottle-shape structure having the neck 15 only on one side.

The body portion 14 and the neck 15 both have the structure in which the liner 11 and the reinforcing layer 12 are layered. In the present embodiment, in the neck 15, a tubular body 40A as an intermediate layer, which will be described later, is disposed between the liner 11 and the reinforcing layer 12. It should be noted that the tubular body 40A described later may entirely cover an outer peripheral surface 11d of the liner 11 that forms the neck 15. However, as long as the sealing property, which will be described later, can be secured, in the neck 15, the tubular body 40A may partially cover the outer peripheral surface 11d of the liner 11 and the remaining surface (specifically, the outer peripheral surface on the opening 13 side) may be covered with the reinforcing layer 12.

In the present embodiment, as an exemplary cylindrical shape, the body portion 14 includes a cylindrical main body portion 14a and a shoulder 14b with its inner and outer diameters reduced from the main body portion 14a toward the end of the body portion 14. The shoulder 14b is a cylindrical portion in a truncated cone shape and the neck 15 is formed continuously with the shoulder 14b.

An annular cap 20 is attached to an outer peripheral surface 12a of the reinforcing layer 12 in the neck 15. A plurality of projections is formed on an inner peripheral surface 22 of the cap 20, and the reinforcing layer 12 is formed so as to dig into (specifically, dig into spaces between the projections) the inner peripheral surface 22. In this manner, the cap 20 can be locked in the reinforcing layer 12. An external thread is formed on an outer peripheral surface 21 of the cap 20, and can be screwed into an internal thread formed on an inner wall surface 34 of the connecting member 30, which will be described later.

Herein, in the present embodiment, the resin to form the liner 11 may have an excellent gas barrier property. Examples of such resin may include a thermoplastic resin, such as a polypropylene resin, a nylon resin (for example, 6-nylon resin or 6,6-nylon resin), a polycarbonate resin, an acrylic resin, an ABS resin, a polyamide resin, a polyethylene resin, an ethylene-vinyl alcohol copolymer (EVOH), or a polyester resin.

The reinforcing layer 12 includes the reinforcing fibers impregnated with a thermoplastic resin or a thermosetting resin as a matrix resin. In the present embodiment, the reinforcing fibers form a fiber bundle. Examples of the reinforcing fibers that can be used may include glass fibers, alamido fibers, boron fibers, and carbon fibers. In particular, carbon fibers may be used in terms of light weight, mechanical strength, or the like. The thermosetting resin may be used as the matrix resin in some cases. Examples of the thermosetting resin to be used may include a phenol resin, a melamine resin, a urea resin, or an epoxy resin, and an epoxy resin precursor may be used in terms of the mechanical strength or the like. The epoxy resin is fluid in an uncured state and forms a solid crosslinked structure when thermally cured.

The reinforcing layer 12 is formed using the filament winding method or the sheet winding method such that a fiber bundle impregnated with a matrix resin is wound around the outer peripheral surface 11a of the liner 11. The reinforcing layer 12 may be a helical layer formed with the fiber bundle wound with inclination relative to an axis line CL of the high-pressure tank 10, for example, a layer formed with the fiber bundle folded with inclination relative to the axis line CL of the high-pressure tank 10.

Each of the pair of connecting members 30, 30 connected to the neck 15 of the high-pressure tank 10 is a member made from metal such as aluminum or steel, and includes a bracket 30A or a manifold 30B. The bracket 30A is a member for restraining a plurality of high-pressure tanks 10, 10 as a unit and mounting them onto a vehicle.

Figure 3A:
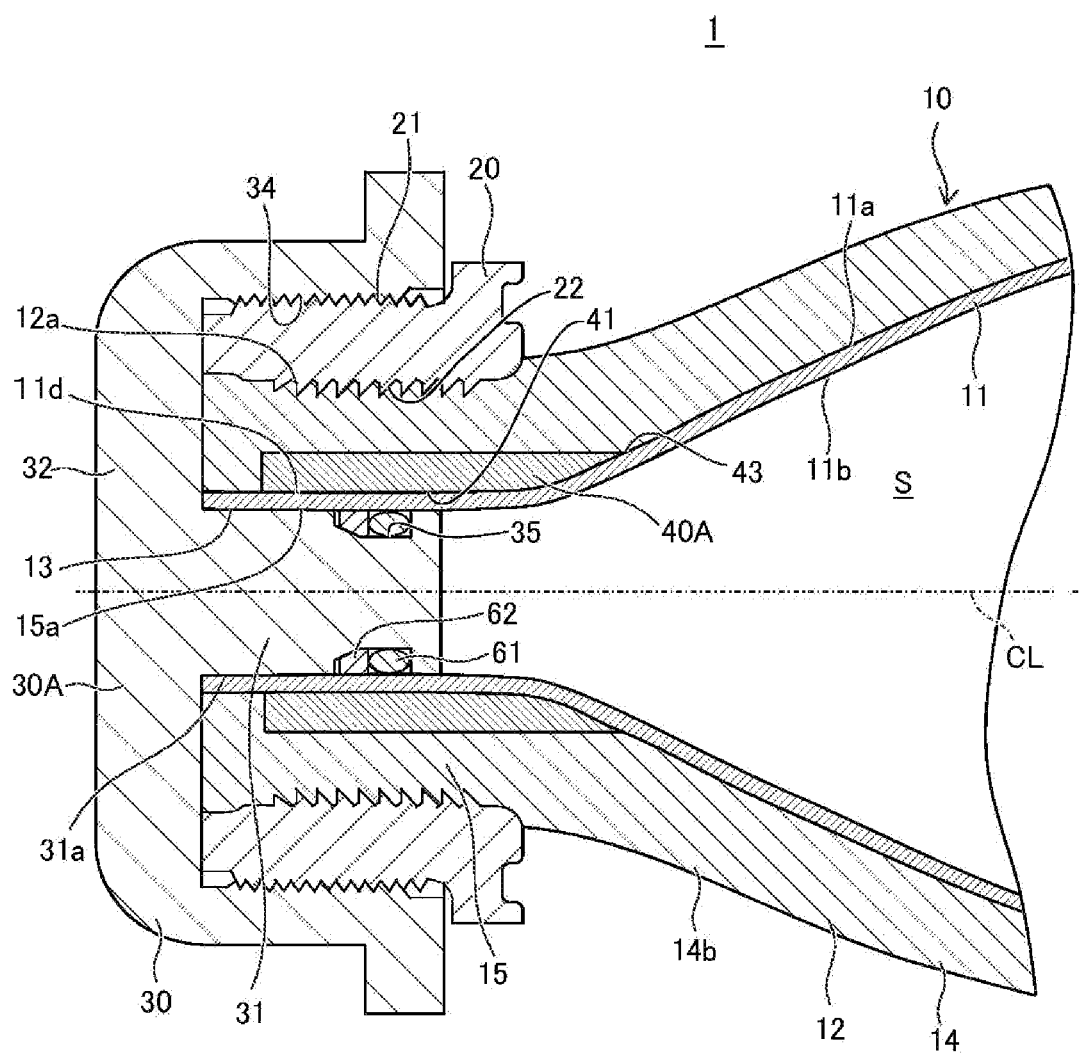
FIG. 3A is an enlarged cross-sectional view of a main part on a bracket side of the tank unit shown in FIG. 2.
Figure 3B:
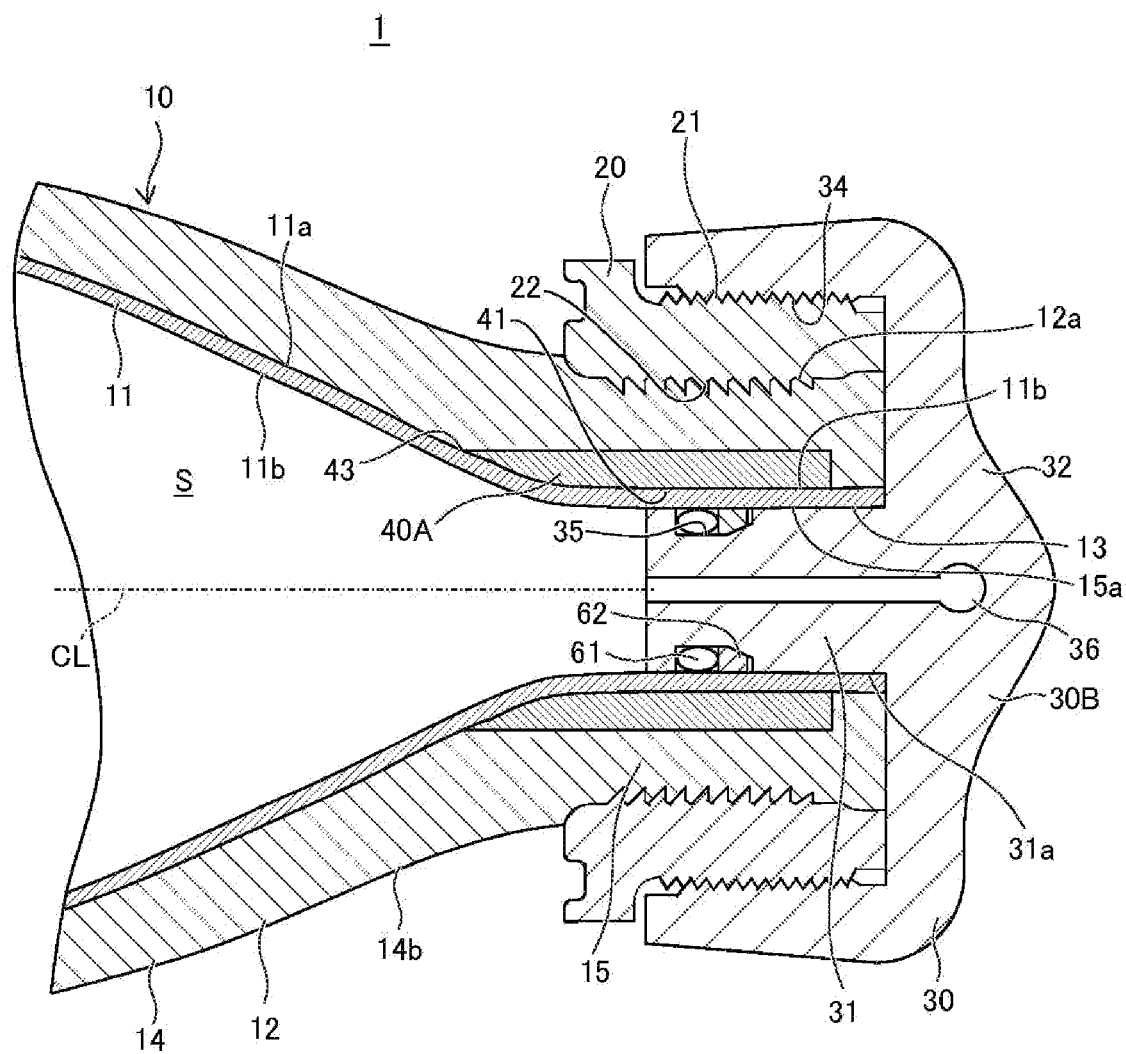
FIG. 3B is an enlarged cross-sectional view of the main part on a manifold side of the tank unit shown in FIG. 2.

The manifold 30B is a member having a gas flow channel formed therein, the gas flow channel adapted to introduce a hydrogen gas into the housing space S of the high-pressure tank 10 and release the hydrogen gas out of the housing space S. As illustrated in FIG. 3A and FIG. 3B, since the bracket 30A and the manifold 30B differ mainly in terms of whether the gas flow channel is formed, the structure of the manifold 30B as the connecting member 30 will be described by referring to FIG. 3B.

The manifold 30B is formed so as to cover the opening 13 formed at an end in the axial direction CL of the high-pressure tank 10 and includes an insert portion 31 and a cap portion 32. The cap portion 32 is screwed into the cap 20 and also covers an end face of the high-pressure tank 10, the cap portion 32 having the insert portion 31 formed in the middle thereof.

The insert portion 31 is a plug-like portion to be inserted, through the opening 13, into the neck 15 of the high-pressure tank 10 along the inner peripheral surface 11b of the liner 11 (specifically, the inner peripheral surface 15a of the neck 15). An annular groove 35 is formed on an outer peripheral surface 31b of the insert portion 31 along the circumferential direction. Annular sealing members 61, 62 for sealing the housing space S are disposed in the annular groove 35. The annular sealing members 61, 62 are formed of a material having a gas barrier property, such as a resin material or a rubber material.

When the housing space S of the high-pressure tank 10 is filled with a high-pressure hydrogen gas, the body portion 14 of the high-pressure tank 10 tends to radially expand due to the internal pressure with the hydrogen gas. At this time, since the neck 15 also tends to radially expand, the contact pressure of the sealing members 61, 62 provided in the insert portion 31 against the liner 11 of the neck 15 is reduced, which could deteriorate the sealing property of the neck 15 of the high-pressure tank 10.

Thus, in the present embodiment, the high-pressure tank 10 includes the tubular body 40A between the liner 11 and the reinforcing layer 12, in a position facing the sealing members 61, 62 so as to surround the outer peripheral surface 11d of the liner 11. The tubular body 40A is a member for restricting the radially expanding deformation of the inner peripheral surface 15a of the neck 15.

Herein, the "radially expanding deformation of the inner peripheral surface 15a of the neck 15" means the radially expanding deformation due to the hoop stress exerted on the neck 15 with the pressure of the hydrogen gas, which is the radially expanding deformation of the liner 11 (more specifically, a portion of the liner 11 abutting the sealing members 61, 62) that forms the neck 15.

Further, an inner peripheral surface (facing surface) 41 of the tubular body 40A abuts the outer peripheral surface 11d of the liner 11 that forms the neck 15. A portion including an end 43 of the tubular body 40A that is on the body portion 14 side becomes thinner toward the end 43 on the body portion 14 side. More specifically, the thinner portion is positioned closer to the body portion 14 side than the tip end face of the insert portion 31, and contacts the surface of the shoulder 14b of the body portion 14 in some cases.

In the present embodiment, the tubular body 40A extends from an inner side (body portion 14 side) than the end face of the high-pressure tank 10 to a portion of the shoulder 14b of the body portion 14, and the reinforcing layer 12 covers the end face of the tubular body 40A on the outer side of the high-pressure tank. In this manner, the tubular body 40A can be prevented from slipping out in the axial direction of the high-pressure tank. However, as long as the tubular body 40A is disposed in a position facing the sealing members 61, 62 and can secure the sealing property of the sealing members 61, 62, the end of the tubular body 40A may reach the end face of the high-pressure tank 10 as in a second embodiment that will be later described, for example.

Examples of the material of the tubular body 40A may include metal material, such as stainless steel and aluminum steel, and a fiber-reinforced resin. As long as the relation in which the radially expanding deformation of the inner peripheral surface 15a of the neck 15 can be restricted is satisfied, the material is not particularly limited. The specific configuration for restricting the radially expanding deformation of the inner peripheral surface 15a of the neck 15 is that the longitudinal modulus of the material along the circumferential direction of the tubular body 40A is higher than the longitudinal modulus of the material along the circumferential direction of the liner 11 and is higher than the longitudinal modulus of the material along the circumferential direction of the reinforcing layer 12.

Specifically, the longitudinal modulus is the Young's modulus. Since the liner 11 is formed of a thermoplastic resin, which is a mechanically isotropic material, the longitudinal modulus of the material along the circumferential direction of the liner 11 is that of the thermoplastic resin. Similarly, when the tubular body 40A is formed of metal material such as stainless steel, since the metal material such as stainless steel is a mechanically isotropic material, the longitudinal modulus of the material along the circumferential direction of the tubular body 40A is that of the metal material.

However, in the present embodiment, the reinforcing layer 12 is formed of a fiber-reinforced resin with the fiber bundle oriented in a predetermined direction, and is thus formed of an anisotropic material. In this case, the longitudinal modulus of the reinforcing layer 12 is that along the circumferential direction of the neck 15 of the reinforcing layer 12.

The longitudinal modulus along the circumferential direction of the neck 15 can be measured such that pieces for a tensile test are prepared, the pieces being formed of the same material as those of these members and having the circumferential material structure suitable for the pulling direction, and the pieces for the tensile test are pulled.

For example, when the fiber bundle of the fiber-reinforced resin that forms the reinforcing layer 12 is oriented along the circumferential direction of the neck 15, the longitudinal modulus of the tensile test piece of the fiber-reinforced resin in which the reinforcing fibers are oriented along the pulling direction is measured. Meanwhile, when the fiber bundle is oriented parallel to the shaft center (i.e., the axis line CL of the high-pressure tank 10) of the neck 15, the longitudinal modulus of the tensile test piece of the fiber-reinforced resin in which the reinforcing fibers are oriented in a direction orthogonal to the pulling direction is measured.

For instance, when the liner 11 is formed of a thermoplastic resin and the reinforcing layer 12 is formed of a fiber-reinforced resin, the tubular body 40A may be formed of metal such as stainless steel. Further, when the reinforcing layer 12 includes the fiber bundle of carbon fibers as the reinforcing fibers and the fiber bundle is formed with inclination relative to the axis line CL of the high-pressure tank 10, the tubular body 40A may be formed of a fiber-reinforced resin wound in a hoop.

When such a high-pressure tank 10 is produced, the liner 11 is produced through extrusion molding of a melted thermoplastic resin, and subsequently, the tubular body 40A is fitted to each of the opposite ends of the liner 11, and then, the reinforcing layer 12, together with the tubular bodies 40A, 40A, is formed on the liner 11 using the filament winding method, for example. When the matrix resin of the reinforcing layer 12 is a thermosetting resin, the cap 20 is attached to each neck 15 at the opposite ends of the high-pressure tank 10, and the thermosetting resin is then thermally cured.

According to the present embodiment, the insert portion 31 of the connecting member 30 is inserted through the opening 13 into the neck 15 of the high-pressure tank 10, and the annular sealing members 61, 62 contact the inner peripheral surface 15a of the neck 15 so that the housing space S for the hydrogen gas can be sealed.

Herein, when the housing space S of the high-pressure tank 10 is filled with a high-pressure fluid, the body portion 14 and the neck 15 tend to expand in the radial direction of the high-pressure tank 10 due to the internal pressure with the fluid. However, in the present embodiment, the tubular body 40A is disposed between the liner 11 and the reinforcing layer 12, in a position facing the sealing members 61, 62 so as to surround the outer peripheral surface 11d of the liner 11, so that the tubular body 40A restricts the radially expanding deformation of the inner peripheral surface 15a of the neck 15.

That is, the specific configuration for restricting such deformation is that in the neck 15, the longitudinal modulus of the material along the circumferential direction of the tubular body 40A is higher than each of the longitudinal moduli of the materials along the circumferential direction of the liner 11 and the reinforcing layer 12. Thus, as compared to a case without the tubular body 40A, the radial expansion of the liner 11 due to the hoop stress caused by the high-pressure hydrogen gas can be suppressed by the tubular body 40A. As a result, the sealing property of the sealing members 61, 62 in the neck 15 of the high-pressure tank 10 can be secured.

In addition, since in the tubular body 40A, a portion including the end on the body portion 14 side becomes thinner as it gets closer to the end on the body portion 14 side, the end on the body portion 14 side is likely to deform. Thus, when the housing space of the high-pressure tank is filled with a high-pressure hydrogen gas, the end 43 of the tubular body 40A follows the deformation of the liner 11 in such a manner as radially expanding. Therefore, the stress exerted on the portion of the liner 11 contacting the end 43 is reduced so that the damage to the liner 11 can be prevented.

Figure 4:
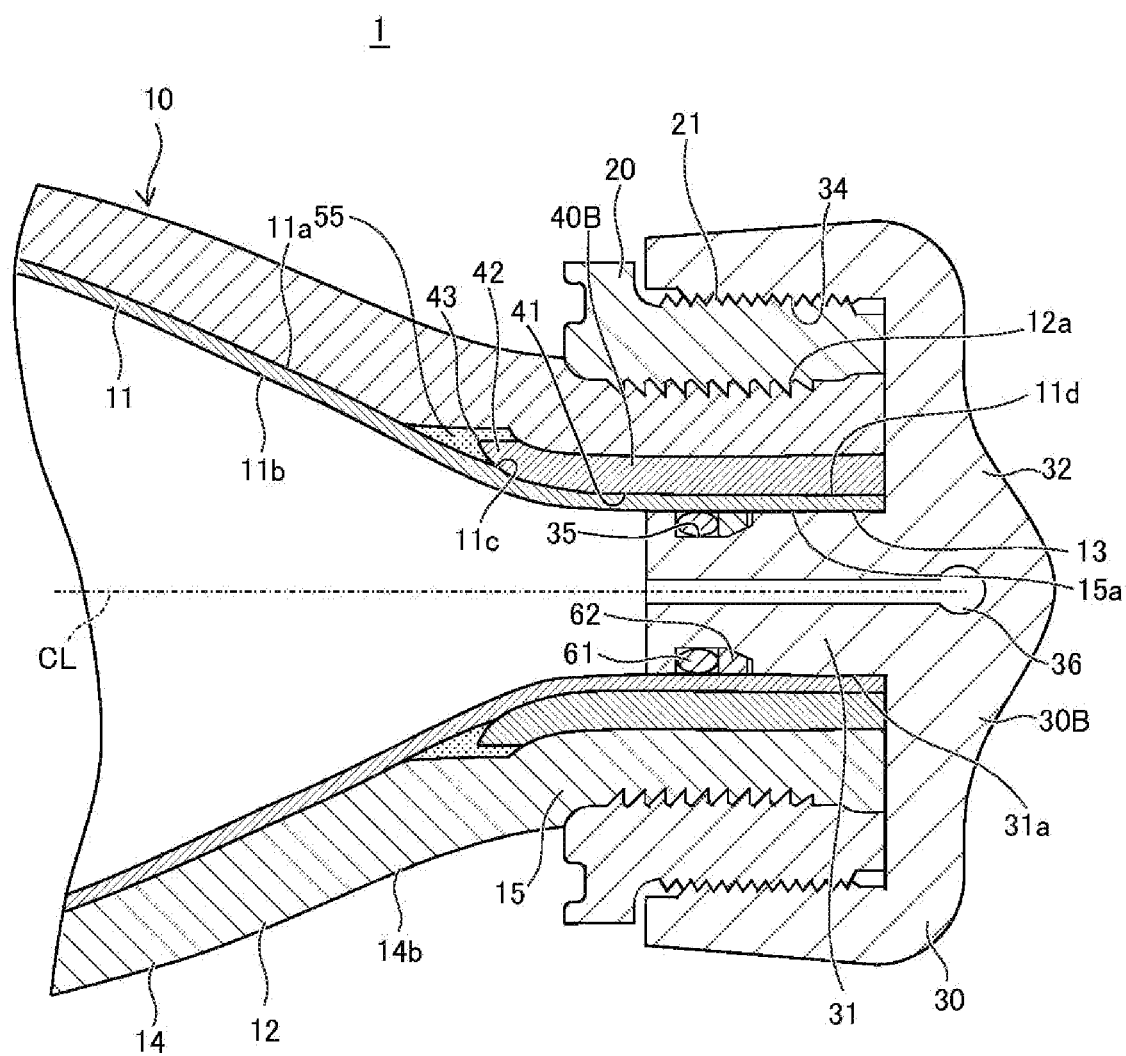
FIG. 4 is an enlarged cross-sectional view of the main part of the tank unit, which corresponds to FIG. 3B, according to a second embodiment.

The tank unit 1 according to the second embodiment will be described below. FIG. 4 is a cross-sectional view of the main part of the tank unit 1, which corresponds to FIG. 3B, according to the second embodiment. The tank unit 1 according to the second embodiment differs from the first embodiment in the shape of a tubular body 40B and in that an annular cap (cushioning material) 55 is provided at the end 43 of the tubular body 40B.

In the present embodiment, an end on one side of the tubular body 40B is exposed from the high-pressure tank 10, and the end 43 on the other side of the tubular body 40B, which is on the body portion 14 side, is covered with the cap 55 whose material is softer than that of the tubular body 40B. The cap 55 is tapered toward the body portion 14 side.

Specifically, when the material of the tubular body 40B is metal, the material of the cap 55 used herein is a resin material or a rubber material that is more likely to elastically deform than the material of the tubular body 40B. In some cases, the material of the cap 55 may be softer than that of the liner 11, but may be the same as that of the liner 11, for example.

According to this aspect, when the housing space S of the high-pressure tank 10 is filled with a high-pressure hydrogen gas, the liner 11 contacts the end 43 of the tubular body 40B, not directly but via the cap (cushioning material) 55. Therefore, the stress exerted on an edge portion 11c in the region where the tubular body 40B contacts the liner 11 can be reduced.

Figure 5:
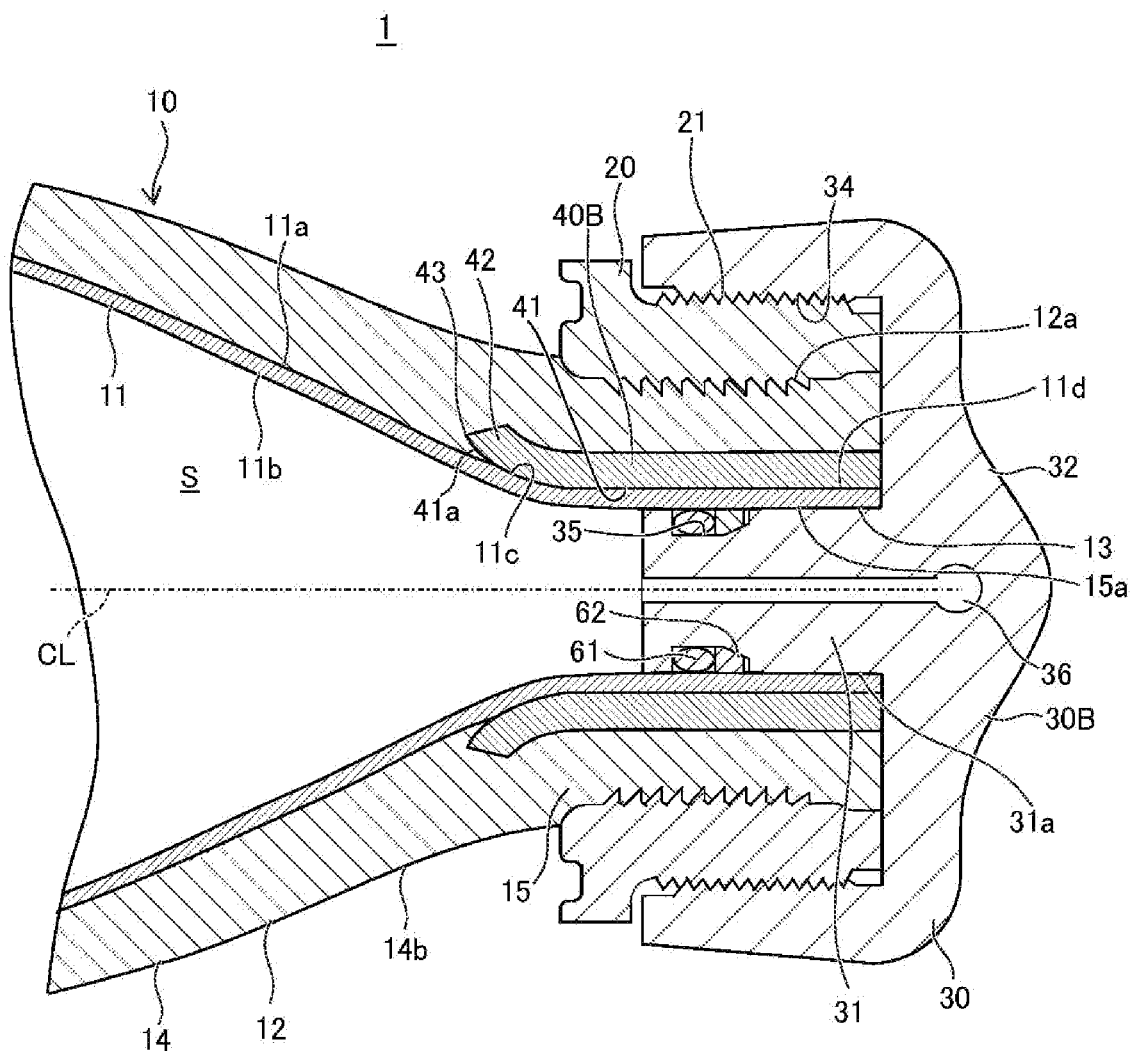
FIG. 5 is an enlarged cross-sectional view of the main part of the tank unit, which corresponds to FIG. 3B, according to a modification of the second embodiment.

In view of these points, as in a modification of FIG. 5, for example, the facing surface 41 on the body portion 14 side of the tubular body 40B that faces the outer peripheral surface of the liner 11 may expand in the radial direction of the tubular body 40B in such a manner as leaving the outer peripheral surface 11a of the liner 11. In this manner, since the facing surface 41a on the body portion 14 side expands in the radial direction of the tubular body 40B in such a manner as leaving the outer peripheral surface 11a of the liner 11, the contact of the liner 11 with the inner edge of the tubular body 40B can be avoided, so that the damage to the liner 11 can be avoided. The aforementioned material having a cushioning property may be further disposed between the facing surface 41a on the body portion 14 side and the outer peripheral surface 11a of the liner 11.

Although the embodiments of the present disclosure have been described in detail, the present disclosure is not limited thereto, and various design changes can be made within the scope without departing from the spirit of the present disclosure described in the claims.

What is claimed is:

1. A tank unit comprising:
   a high-pressure tank including:
   a liner in which a housing space for housing a fluid is formed, with an opening formed on at least one end side thereof;
   a reinforcing layer formed of a fiber-reinforced resin, the reinforcing layer covering an outer peripheral surface of the liner;
   a body portion having the housing space; and
   a neck in which the opening is formed, the neck continuous with at least one end of the body portion; and
   a connecting member having an insert portion to be inserted into the neck through the opening along an inner peripheral surface of the liner, the connecting member connected to the high-pressure tank so as to cover the opening,
   wherein
   the connecting member has an annular sealing member disposed between the liner and the insert portion, the annular sealing member adapted to seal the housing space,
   the high-pressure tank has a tubular body disposed between the liner and the reinforcing layer, in at least a position facing the sealing member, so as to surround the outer peripheral surface of the liner, the tubular body adapted to restrict radially expanding deformation of an inner peripheral surface of the neck,
   a longitudinal modulus of a material along a circumferential direction of the tubular body is higher than a longitudinal modulus of a material along a circumferential direction of the liner and is higher than a longitudinal modulus of a material along a circumferential direction of the reinforcing layer;
   an end of the tubular body on a side of the body portion is positioned between the reinforcing layer and the liner,
   the end radially expands away from the liner and is sharpened, and
   the end is covered with a cushioning material that is softer than a material of the tubular body so that an outer peripheral surface of a portion including the end contacts the reinforcing layer via the cushioning material and an inner peripheral surface of the portion including the end contacts the liner via the cushioning material.

2. The tank unit according to claim 1, wherein a portion of the tubular body that includes the end of the tubular body on a side of the body portion becomes thinner toward the end of the tubular body on the side of the body portion.

3. The tank unit according to claim 1, wherein a facing surface of the tubular body that faces the outer peripheral surface of the liner and that is on a side of the body portion expands in a radial direction of the tubular body in such a manner as leaving the outer peripheral surface of the liner.

* * * * *